United States Patent [19]
Suntheimer et al.

[11] 3,934,596
[45] Jan. 27, 1976

[54] SHAMPOOING APPARATUS

[75] Inventors: George Suntheimer, Hanover; John R. Howatt, Waltham; Emanuel J. Consales, Winchester, all of Mass.

[73] Assignees: Robert B. Patterson; Mary D. Patterson; William A. Patterson, all of Braintree, Mass.

[22] Filed: Nov. 23, 1973

[21] Appl. No.: 418,559

[52] U.S. Cl. .................................... 132/9; 4/159
[51] Int. Cl.² ............................................ A45D 19/00
[58] Field of Search ............ 132/9; 4/159; 34/94, 97

[56] References Cited
UNITED STATES PATENTS

| | | | |
|---|---|---|---|
| 998,804 | 7/1911 | Salisbury | 132/9 |
| 3,474,794 | 10/1969 | Nelson | 132/9 |
| 3,521,647 | 7/1970 | Mercer | 132/9 |
| 3,575,181 | 4/1971 | Rudd | 132/9 |
| 3,653,376 | 4/1972 | Martin | 132/9 |

Primary Examiner—G. E. McNeill
Attorney, Agent, or Firm—Wolf, Greenfield & Sacks

[57] ABSTRACT

The machine is for shampooing and cleansing a person's hair and is constructed with a sink in front of which the person preferably sits and means associated with the sink for receiving the head with the face directed substantially downwardly. Once in position a hood is pivotal to cover the hair and has a nozzle array associated therewith. This nozzle array includes individual nozzles for dispensing a shampoo, creme rinse, or rinse water. The machine can be operated manually to apply shampoo, creme rinse or a water rinse, or can be operated automatically in a pre-programmed manner. The machine is provided with control circuitry including a binary counter and associated decoder logic, temperature regulation circuitry and temperature sensors. The shampoo and creme rinse are contained in individual containers at least one of which is provided with a mixing chamber for mixing the incoming hot and cold water prior to dispensing through the nozzle array.

36 Claims, 16 Drawing Figures

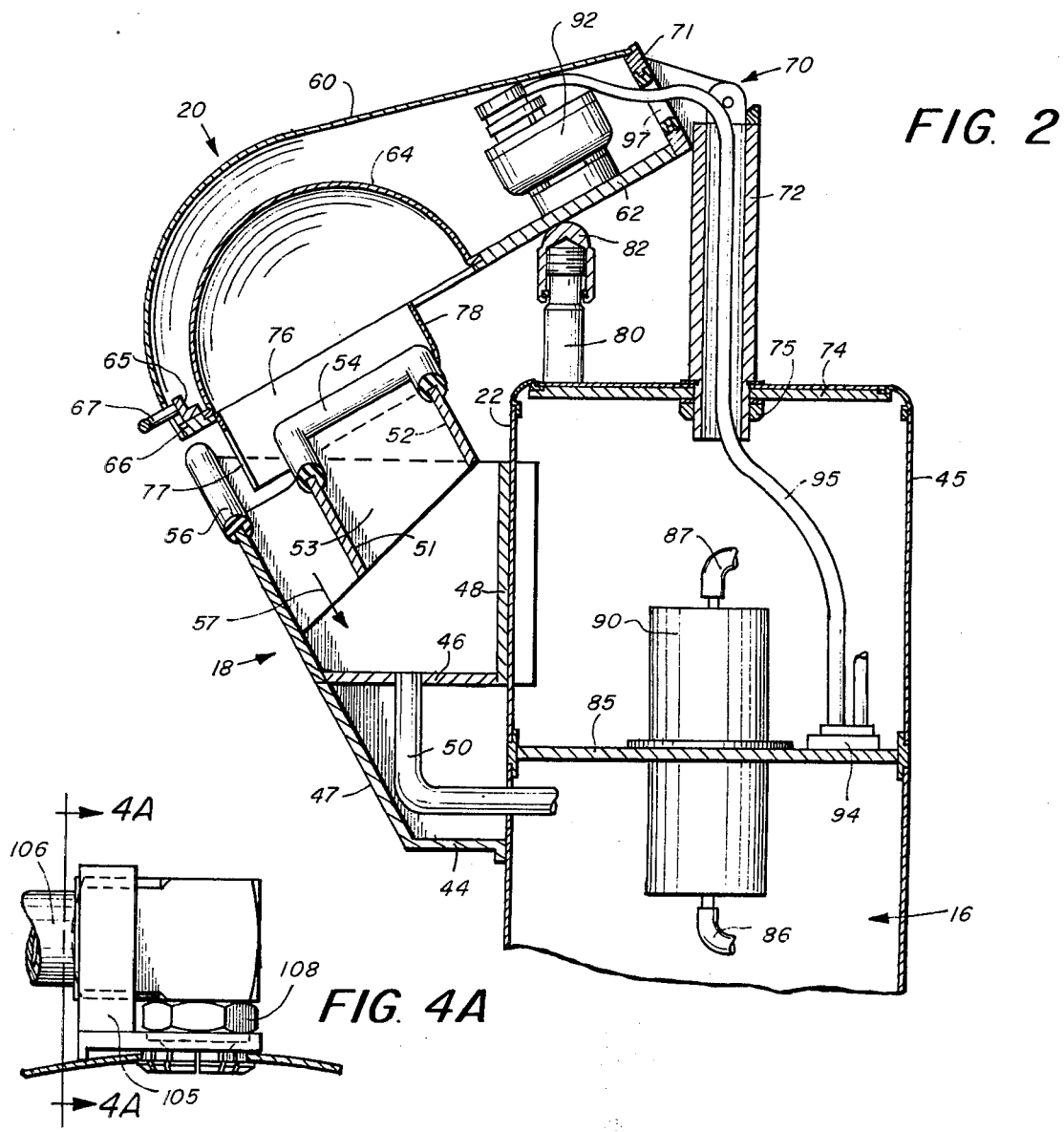
*FIG. 2*
*FIG. 4A*
*FIG. 4B*
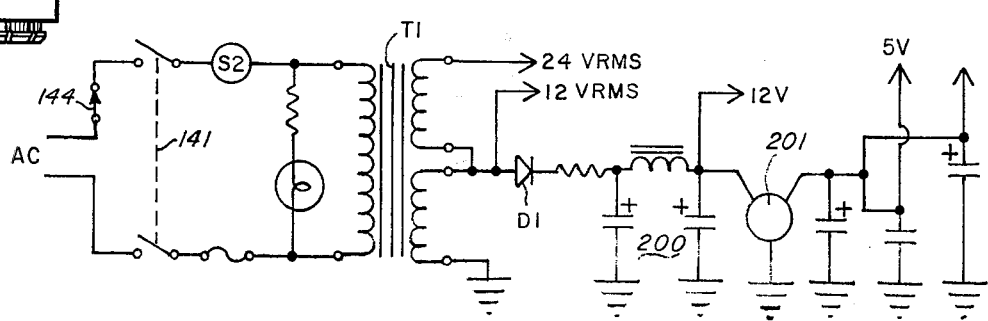
*FIG. 8*

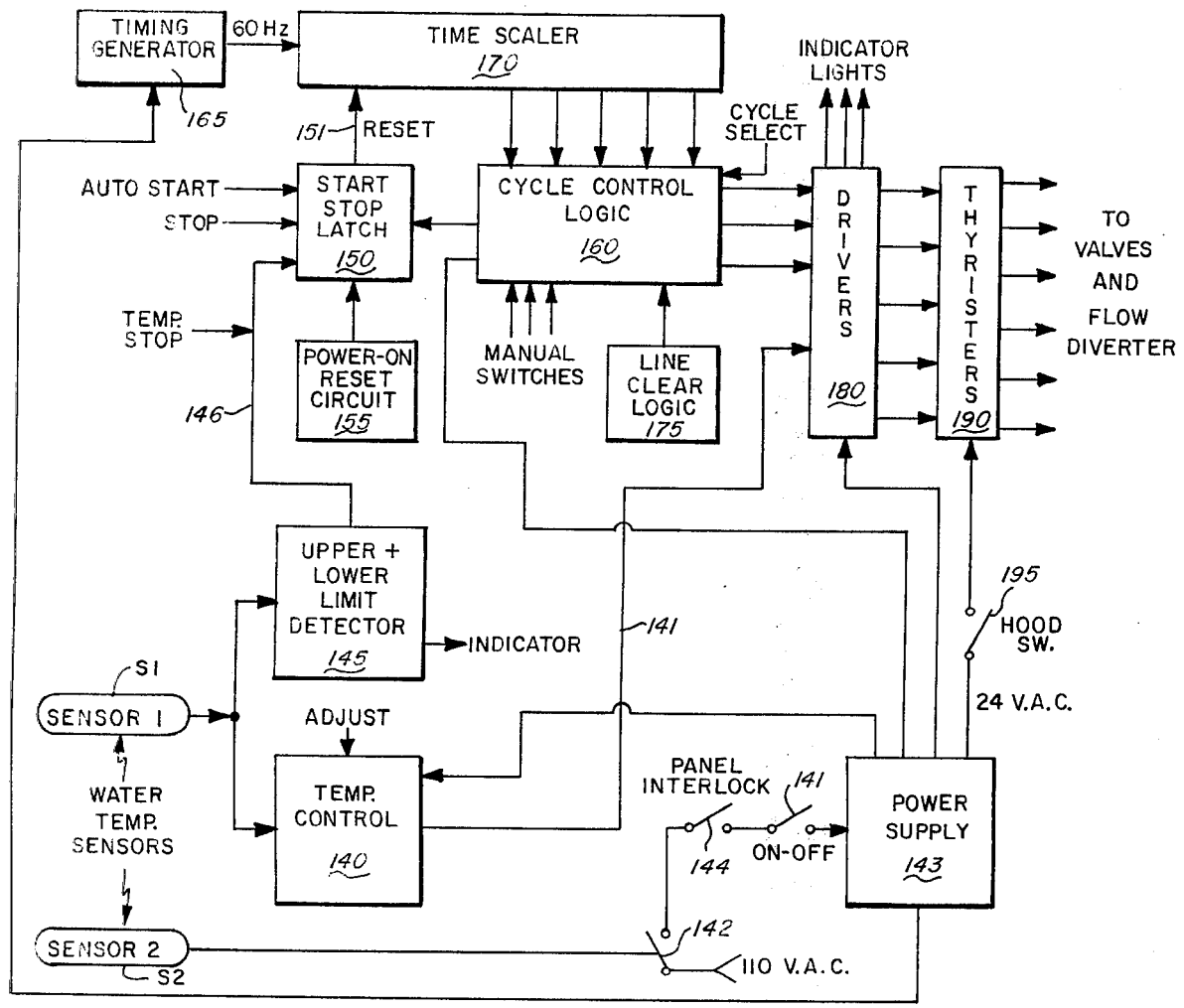
FIG. 7
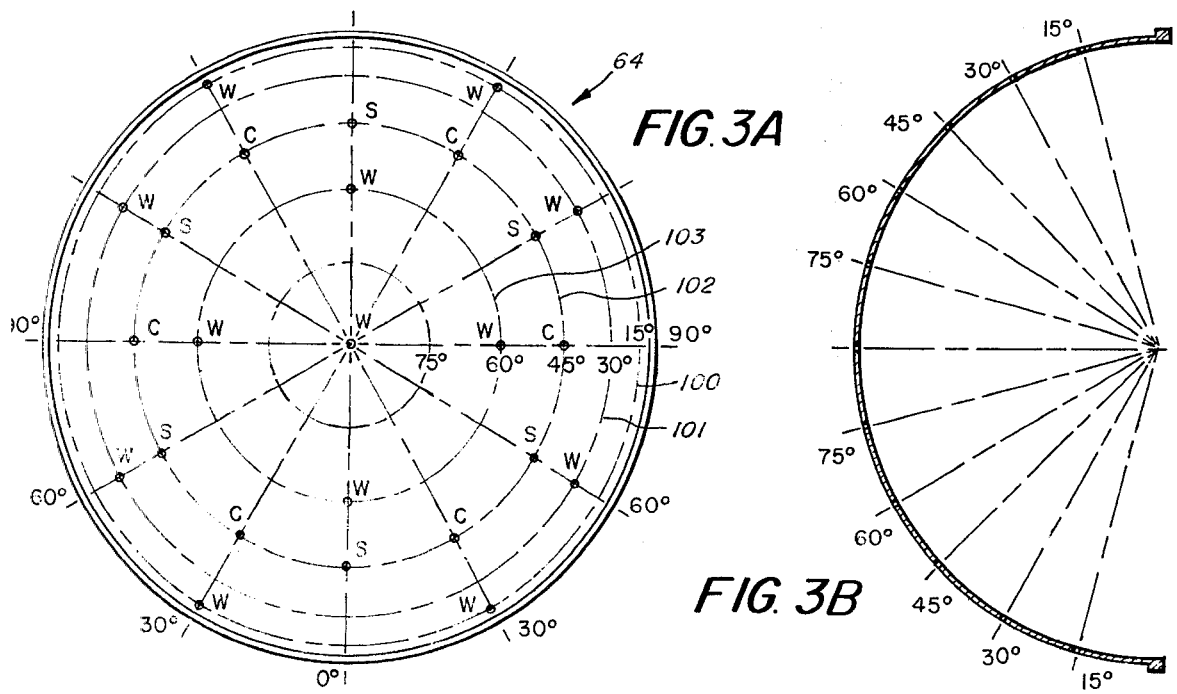
FIG. 3A
FIG. 3B

SHAMPOOING APPARATUS

FIELD OF THE INVENTION

The present invention relates in general to an improved shampooing apparatus. More particularly, this invention is directed to a shampooing apparatus that accommodates a customer or user in a seated position and that can be readily operated either manually or automatically.

BACKGROUND OF THE INVENTION

Shampooing machines which, for example, may be used in beauty parlors or hospitals are generally constructed so that the customer or user is reclined in a supine position. This position has been found to be somewhat uncomfortable but has been considered in the past as the accepted position for cleansing hair apparently at least in part because in this position the hair readily drapes from the head. Although the hair may be adequately cleaned, in this position it is questionable as to whether the scalp is properly cleaned. However, in accordance with the present invention it has been found that more efficient cleansing of the scalp and hair is provided by having the person assume a preferably seated position facing the machine with the face inserted in a sink or the like and the hair draped in a normal manner. In accordance with this invention there is provided a hood having a nozzle array associated therewith for directing liquids more directly at the scalp without substantial interference from the hair.

Accordingly, one object of the present invention is provide improved shampooing apparatus wherein the customer or user is preferably in a seated position rather than a supine position.

Another object of the present invention is to provide a shampooing apparatus that is more comfortable for the customer or user than prior known machines.

A further object of the present invention is to provide a shampooing machine that provides a more thorough shampooing and cleansing of the hair and scalp than was possible with prior machines.

Still another object of the present invention is to provide a machine for shampooing the hair and scalp and that can be operated by an operator either under manual control or in a pre-programmed automatic mode.

Another object of the present invention is to provide a shampooing apparatus wherein the temperature of the dispensed water can be accurately controlled, and wherein the machine also includes safety interlocks for preventing hot water from being dispensed from the machine.

Still a further object of the present invention is to provide a shampooing apparatus that is characterized by improved control circuitry.

Another object of the present invention is to provide a shampooing apparatus including a hood having a nozzle array associated therewith wherein the nozzles of the array are disposed in a novel pre-determined pattern.

SUMMARY OF THE INVENTION

To accomplish the foregoing and other objects there is provided an apparatus for cleansing a person's hair and scalp, which apparatus generally comprises a sink, means for supporting the sink at a pre-determined height, a hood means moveable between alternate positions, and means disposed within the hood means for directing water, shampoo, or creme rinse at the scalp. The sink includes means for receiving the person's face and assisting in preventing liquid from reaching the face. The person assumes a seated position having his face directed generally downwardly. The hood in one position permits the person to place his face in the receiving means and in the other position covers the head and scalp.

The machine of the present invention can be operated in two basic modes, namely the manual mode or the automatic mode. In the manual mode shampoo, creme rinse, or rinse water can be applied under control of the operator. In the automatic mode the machine is provided with electronic control circuitry arranged in a pre-programmed manner for providing either a shampoo cycle or a shampoo and creme rinse cycle.

One of the features of the present invention is concerned with containers for the shampoo and creme rinse. Preferably, the creme rinse container or tank is provided with a bottom mixing compartment into which the cold and hot tap water flow. This compartment may be provided with baffles and a perforated upper plate for pressurizing the creme rinse holder, and at the same time function as a mixing chamber.

Other features of the present invention which are discussed in more detail hereinafter reside in the novel control circuitry, for example, and the placement of the nozzles of a nozzle array associated with the hood of the machine.

BRIEF DESCRIPTION OF THE DRAWINGS

Numerous other objects, features and advantages of the invention should now become apparent upon a reading of the following detailed description taken in conjunction with the accompanying drawings, in which:

FIG. 2 is a cross-section view of a part of the machine shown in FIG. 1, and in particular the sink and hood structures;

FIGS. 3A and 3B show, respectively, front and side view of the nozzle array and holder shown in FIG. 2;

FIG. 4A is a detailed drawing of one of the nozzles shown in FIG. 3A;

FIG. 4B is a cross-sectional view taken along line 4—4 of FIG. 4A.

FIG. 7 is a block diagram of the control circuitry of the present invention;

FIG. 8 is a detailed circuit diagram of the power supply shown in FIG. 7;

DETAILED DESCRIPTION

Figure 1:
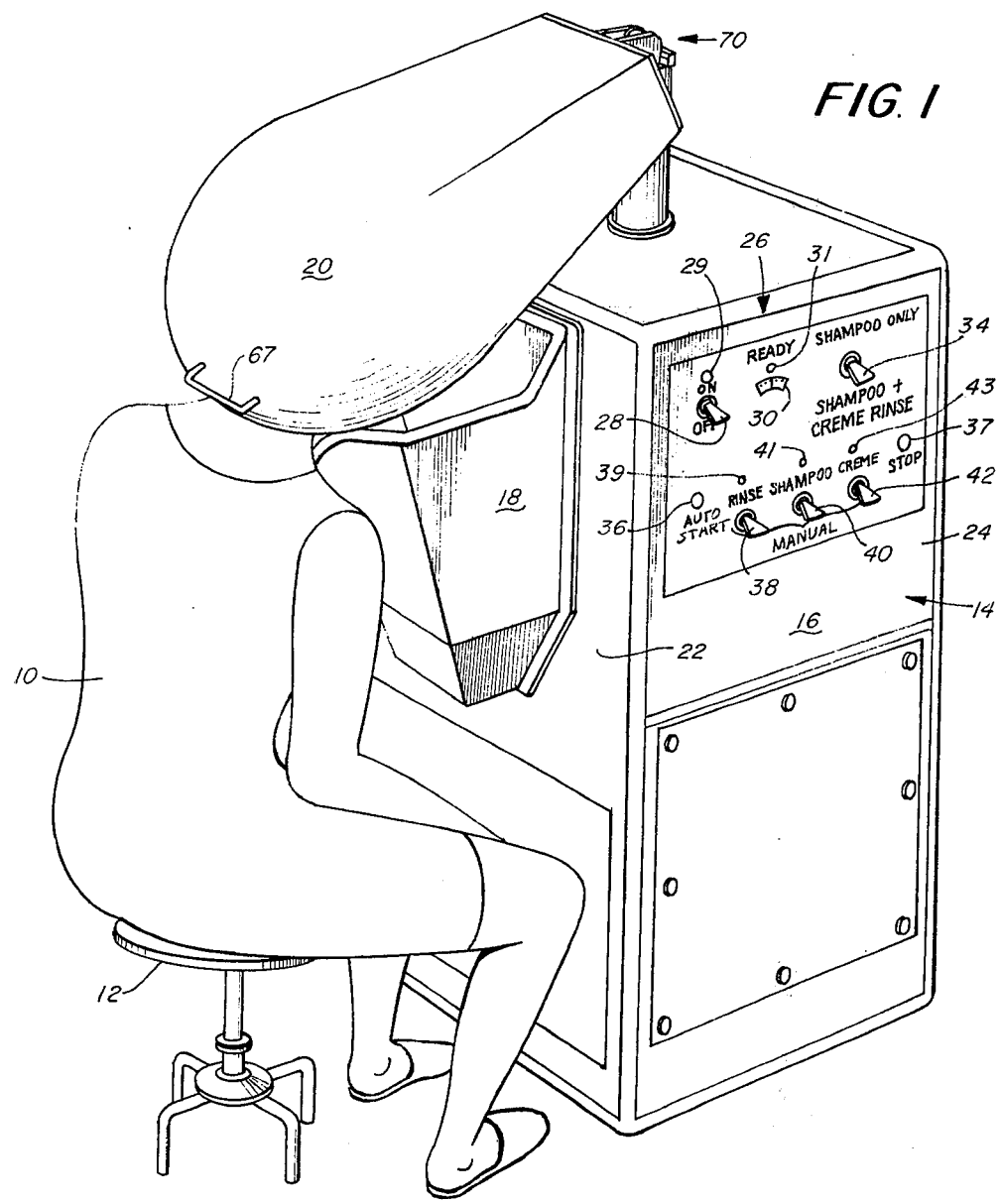
FIG. 1 is perspecitive view of the overall machine of the present invention with a person seated in the normal shampooing position.

FIG. 1 shows a person 10 seated on a stool 12 in front of the shampooing apparatus 14 of the present invention. The apparatus 14 generally comprises a box-like housing 16, a sink 18 and a hood 20. The person is seated facing the wall 22 with the head resting in the sink 18 and covered by the hood 20. The box-like enclosure 16 is for containing many of the components making up the machine and includes a side-wall 24 for supporting a control panel 26. The control panel 26 includes a number of switches and lights which shall be referred to hereinafter with reference to the control circuitry of the present invention. Control panel 26 includes an on-off switch 28 and associated light 29, a temperature dial 30 and associated ready light 31, a select switch 34 for selecting one of two pre-determined operating cycles, an auto-start push-to-operate button 36, and a stop push-to-operate button 37. There is also included manual switches 38, 40 and 42 and their associated lights 39, 41 and 43 for manually controlling the respective water rise, shampoo and creme rinse operations.

FIG. 2 is a cross-sectional diagram showing in particular the sink 18 and hood 20 in somewhat more detail. The sink and hood may be constructed of a hard plastic material. FIG. 2 shows principally the top end 45 of housing 16 wherein the shampoo and creme rinse containers are disposed.

The sink 18 comprises a number of walls preferably integrally connected and including a slanted wall 47, a bottom wall 44, an intermediate wall 46 integrally formed with the slanted wall 47, and an upright wall 48 which is secured to the front wall 22 of housing 16. The upright wall 48 may be secured to the housing in any suitable manner such as by the use of bolts. The intermediate wall 46 has an aperture for accommodating a drain pipe 50 which couples to a suitable output pipe (not shown) for carrying the dispensed liquids away from the shampooing apparatus.

The sink 18 also includes a four-sides face-rest shown in FIG. 2 as being constructed of opposing walls 51 and 52. This face-rest will also include opposite side-walls such as the side-wall 53 shown in FIG. 2. A preferably rubber face-rest 54 fits about the four walls and the walls 51 and 52 have an arcuate upper edge which is configures to tightly accommodate the chin and forehead of the face. The slanted wall 47 also has an arcuate upper edge for receiving a preferably rubber neck-rest 56.

When the person is in position with the face resting on the rest 44 a seal is provided so that no liquids should pass between the walls 51 and 52. The liquids dispensed from the hood 20 primarily travel along a path generally indicated by the arrow 57 to the drain 50.

The hood 20 includes an outer cap 60 which may be constructed of plastic, a bottom support plate 62 and a holder 64 for the array of nozzles which are more clearly depicted in FIGS. 3A and 3B. The pattern of the nozzles in the array is discussed in more detail with reference to FIGS. 3A and 3B hereinafter. An L-shaped holder 65 is fastened to a portion 66 of bottom plate 62. A U-shaped handle 67 (see also FIG. 1) is secured integral of the cap 60 to this L-shaped member 65, and extends through an aperture in cap 60 to outside of the cap 60. The handle 67 is useable to move the hood 20 between the position shown in FIGS. 1 and 2 and an open position.

The hood 20 is connected at its end by means of a pivot mechanism 70 which is also depicted in FIG. 1. This pivot mechanism interconnects the end plate 71 of the hood with the cylindrical upright support member 72. Member 72 couples to the top wall 74 of the housing 16. A suitable securing ring 75 may be used to maintain the member 72 in its upright position.

The hood 20 also includes a downwardly depending annular section 76 which is constructed at one end 77 to be received by the back of the person's neck and at the front end 78 to contact the rest 54 and provide a seal at both ends and completely around the annular member 76.

A post 80 also extends from the top wall 74 of the housing and has a bumper 82 affixed to the top end thereof. The bumper 82 limits the downward position of the hood 20 by contacting the under surface of bottom plate 62. A bearing may be provided between the bumper 82 and the post 80. The post 80 is secured to wall 74 in a suitable manner.

Figure 6:
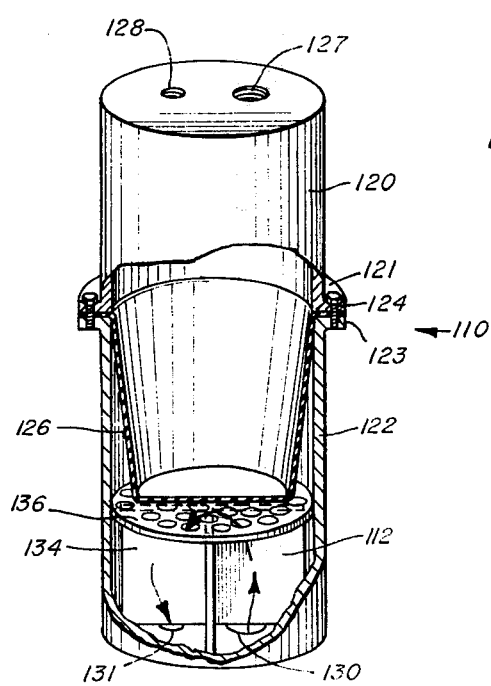
FIG. 6 is a perspective view, partially cut away, of the creme rinse tank schematically depicted in FIG. 5.

FIG. 2 also shows some of the components integral of the housing 16. A wall 85 is provided for holding the shampoo tank 90 which has a bottom inlet 86 and a top outlet 87 associated therewith. The inlet 86 pressurizes the tank 90 and the tank 90 preferably includes a plastic liner for holding the shampoo. When the appropriate pressure is applied by way of the inlet 86 shampoo is fed by way of outlet 87 to the appropriate nozzles of holder 64. The structure of the tank 90 may be quite similar to the creme rinse tank shown in FIG. 6 except that the shampoo tank does not include a bottom mixing chamber as shown in FIG. 6.

FIG. 2 also shows, mounted on wall 85, a flow diverter 92 which may be of the type shown in U.S. Pat. No. 3,773,078. The flow diverter is selectively operated by valve 94 which is the rinse valve shown also in FIG. 11. A tube 95 couples from valve 94 by way of upright 72 to the flow diverter 92. The tube 95 couples by way of an aperture 97 in endwall 71 of the hood 20. The control of the flow diverter 92 is discussed in more detail hereinafter with reference to the schematic flow diagram of FIG. 5 and the circuit diagram of FIG. 11.

FIGS. 3A and 3B show, respective, front and side views of the holder 64 depicted in FIG. 2. This holder is substantially semi-spherical in shape. The holder 64 is shown in FIG. 3A as having a number of holes therein for accommodating nozzles which are arranged about concentric locii. In FIG. 3A the water nozzles are identified by the reference character W, the shampoo nozzles by the reference character S and the creme rinse nozzles by the reference character C. Thus, the outermost locus 100 has two oppositely disposed pairs of water nozzles. The next locus 101 has similar oppositely disposed water nozzles that are circumferentially displaced from the water nozzles of locus 100. The next most inner locus 102 has all of the creme rinse and shampoo nozzles disposed therealong alternating at 30° intervals. The innermost locus 103 has four orthogonally disposed water nozzles therealong. It is noted that adjacent water nozzles are disposed at different distances from the center of the holder.

Regarding the side view of FIG. 3B the locuses 100, 101, 102 and 103 are disposed respectively at 15°, 30°, 45° and 60°. It is noted in FIG. 3A that there are water nozzles disposed in different locuses at each 30° interval. It is preferred that some of the water nozzles are disposed on one side of locus 102 and others are disposed on the other side of locus 102. It has also been found to be a preferred arrangement wherein the shampoo nozzles are disposed at 60° intervals and the creme rinse nozzles are also disposed at 60° intervals with the creme rinse and shampoo nozzles being alternating as shown in FIG. 3A.

FIGS. 4A and 4B show two different views of one of the nozzle arrangements of the present invention. This nozzle arrangement includes a holder 105, an input tube 106 and a spray end 108. This nozzle arrangement is substantially conventional.

Figure 5:
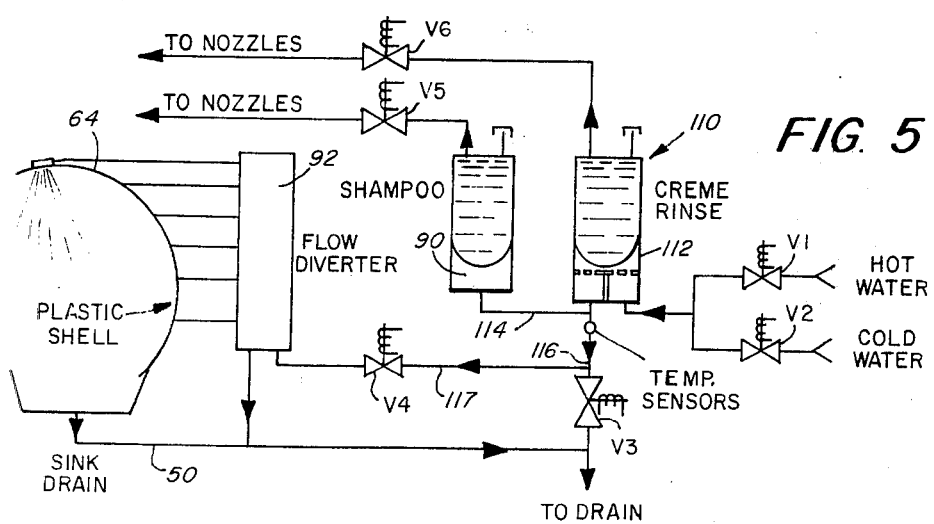
FIG. 5 is a schematic flow diagram associated with the apparatus of the present invention.

FIG. 5 shows a general schematic flow diagram depicting many of the basic components of the apparatus. This diagram shows the shampoo tank 90 previously illustrated in FIG. 2 and the flow diverter 92 also illustrated in FIG. 2. The creme rinse tank and its mixing chamber is discussed in more detail hereinafter in FIG. 6.

The hot and cold water lines couple, respectively, to valves V1 and V2. The output lines from these valves couple in common to the mixing chamber 112. The mixing chamber is provided with a perforated plate which allows for pressurizing of the tank 110. A line 114 coupling to the shampoo tank 90 also allows for pressurizing of the shampoo contained therein. Each of the tanks 90 and 110 include respective fill ports and output lines that couple, respectively, to valves V5 and V6. The output of these valves couple to the nozzles associated with semi-spherical holder 64. Thus, for example, operation of valve V5 conveys shampoo to the S nozzles arranged about locus 102 in FIG. 3A.

The mixed water from chamber 112 is also coupled by way of line 116 to valve V3 which, when in an open position, causes a draining of the liquid from the mixing chamber 112. The line 116 also interconnects with fluid line 117 which couples to valve V4 which is the same valve 94 that is illustrated in FIG. 2. The shampoo tank 90 which is shown in FIGS. 2 and 5 may be of substantially identical construction with the exception that the shampoo tank would not include a bottom mixing chamber 112 as shown in FIG. 6. The tank 110 comprises a top section 120 having a flange 121 and a bottom section 122 having a flange 123. In FIG. 6 a series of bolts 124 are shown for attaching the flanges 121 and 123 together with the edge of diaphragm 126 disposed therebetween. The diaphragm 126 contains the creme rinse which may be refilled by way of port 127. The outlet from the tank 110 is by way of outlet port 128. The lower section 122 also includes two ports 130 and 131. Port 130 receives the yet not completely mixed hot and cold water and port 131 is the discharge port from the mixing chamber 112. Disposed in chamber 112 are four baffles 134 which are orthogonally disposed about chamber 112. A perforated plate 136 is positioned above the baffles 134 and it is through these perforations that the tank is pressurized. The creme rinse container is preferably the one that is provided with the mixing chamber because the creme rinse is applied without rinse water, but will be heated by the water flowing through the mixing chamber 112.

Referring now to FIG. 7 there is shown a block diagram of the control circuitry of the present invention for facilitating both manual and automatic operation. FIG. 7 generally shows a pair of sensors S1 and S2, temperature control box 140, detector 145, latch 150, control logic 160, scaler 170, and drivers 180.

The temperature sensors S1 and S2, as previously mentioned, may be disposed in line 116 after the hot and cold water has been mixed. The control of the temperature of this water is by means of sensor S1 and control box 140. If the water detected by sensor S1 is too hot valve V1 (see FIG. 5) is closed as determined by control line 141 from box 140 to drivers 180. When the temperature drops below a pre-determined water temperature valve V1 opens. The pre-determined temperature can be slightly altered within the limits of the detector 145.

The upper and lower limits of the water temperature are also sensed by sensor S1 which shows its output also coupling to the upper and lower limit detector 145. When the water temperature is within the correct range, an indicator light 31 (see FIG. 1) associated with the detector is on. Unless the water temperature is in the correct range, the limit detector disables any automatic functioning of the machine. This disabling is provided by way of line 146 shown in FIG. 7 and coupling to the stop-start latch 150.

If the temperature of the water goes over or under the pre-set limit during automatic operation, the operation is terminated and the water is routed down the drain until the automatic operation is started by the operator. Manual operation, however, is effected using the switches on the control panel 26 and the operator can check the machine using this manual mode.

In FIG. 7 there is shown the second sensor S2 which has a contact 142 associated therewith for interrupting the AC voltage to the power supply 143. The sensor S2 is preferably in the same line 116 as the sensor S1 but is mounted downstream from sensor S1. The contact 142 is normally maintained in a closed condition until a pre-set high temperature, which is above the upper limit of the limit detector is reached. If this temperature should be reached because of failure of sensor S1 or due to an operator error during manual operation, contact 142 opens, turning power off to the entire machine and causing the water to be drained immediately, thereby preventing any problem.

The power-on-reset circuit 155 resets the latch 150 and in turn other blocks shown in FIG. 7 when power to the machine is first turned on. At that time, valve V1 is open, valve V3 is open, valve V4 is open for a pre-determined period, valve V5 is closed, valve V6 is closed and the flow diverter is not operating.

FIG. 7 also shows the timing generator 165 which receives an input from power supply 143. The signal from supply 143 is a sinusoidal 60 Hertz signal which is converted by generator 165 into a 60 Hertz square wave signal. This signal is coupled to the time scaler 170. The time scaler 170 accepts the 60 Hertz square wave signal and divides the signal down in frequency to a basic time period of 16.6 seconds. The outputs from the time scaler 170 shown in FIG. 7 couple to cycle control logic 160. These outputs control the automatic cycling of the machine.

The stop-start latch 150 includes a bistable device which in one state initiates the automatic functions of the machine and which in the other state terminates the automatic functions. When the auto-start button is pushed, the latch 150, by way of line 151, permits operation of the scaler 170 and enables the cycle control logic 160. The stop button, if pushed, resets the latch 150 and terminates the cycle immediately. The latch 150 may also be reset from the detector 145 if the temperature strays out of the permitted temperature range. In addition, the reset circuit 155 resets the latch to its stop condition when the power is first turned on. When the latch is reset because of any of the above conditions, the drain valve V3 opens bypassing any water under pressure to the drain. After any resetting action mentioned above, the logic 175 operates the rinse valve V4 and flow diverter for a period of, for example, twelve seconds to clear the lines of residual water, shampoo or creme rinse. This line clear logic 175 is shown in FIGS. 7 as coupling to the cycle control logic 160. This logic is discussed in more detail hereinafter in FIG. 10.

The cycle control logic 160 accepts the five binary inputs from scaler 170 after the scaler has been permitted to operate by way of latch 150 and depending upon the position of the cycle select switch (see FIG. 1) timing commands are generated and coupled to the valves to open and close them in a pre-determined sequence. This sequence is discussed in more detail hereinafter with reference to the detailed circuit diagrams and the timing diagrams shown in FIGS. 12 and 13. When the cycle is completed the latch 150 is reset and the water under pressure is drained. Two basic cycles can be selected by way of switch 34 shown in FIG. 1. These two cycles are either the shampoo cycle or the shampoo and creme rinse cycle.

The drivers 180 accept signals from the logic 160 and also from a temperature control box 140. These drivers amplify the signals received to a point where they can drive the thyristors 190. Signals are also generated to operate the indicator lights as shown on the front panel and associated with certain of the control valves.

The thyristors 190 may be bi-directional silicon control rectifiers or triacs. These thyristors accept the output of the drivers and electronically switch the 24 volt AC power to the valves and flow diverter motor. FIG. 7 also shows the hood switch 195 which can interrupt the power to the thyristors when in an open position. This hood switch is in an open position when the hood is open and closes after a person is in place and the hood is closed.

The power supply 143 which is shown in more detail in FIG. 8 converts the incoming 110 volt AC signal to appropriate AC and DC voltages to operate the different blocks in FIG. 7. A rear panel interlock switch 144 is shown in FIG. 7 and is provided to remove power from the electronics of the machine if the machine is opened for servicing or, for example, to replenish the supply of shampoo or creme rinse.

FIG. 8 shows one embodiment for the power supply of the present invention. This power supply includes a transformer T1 having a primary winding and a pair of series connected secondary windings. The AC voltage couples by way of panel interlock switch 144 and off-on switch 141 to the primary winding. FIG. 8 also shows the sensor S2 which can interrupt power to the primary winding upon detection of an excessively high temperature. The transformer T1 is a step-down transformer having a 24 volt RMS and a 12 volt RMS output. The 12 volt AC signal is also coupled by way of diode D1 to filter circuit 200. The output of the filter circuit couples to transistor regulator 201 and the output of regulator 201 couples by way of a series of capacitors. The output of regulator 201 is a 5 volt logic signal. The output of the filter circuit 200 is a 12 volt DC level. Thus, the power supply of FIG. 8 provides both AC and DC voltages which are used, as indicated in FIG. 8, in different components or boxes shown in the block diagram of FIG. 7.

Figure 9:
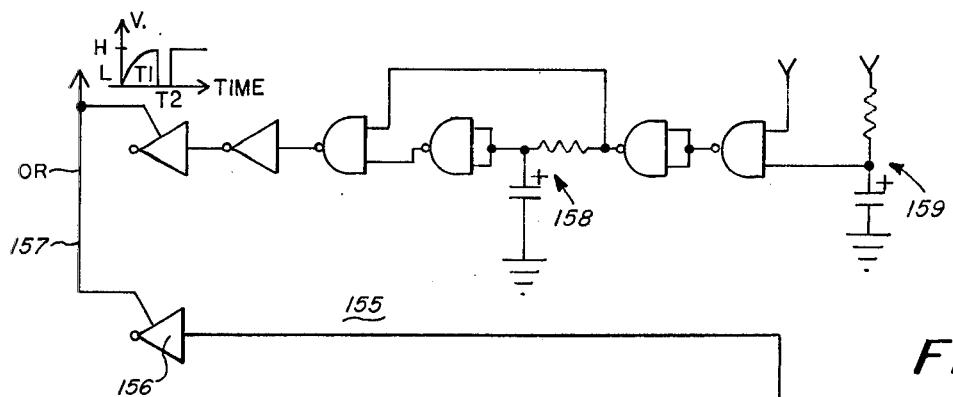
FIG. 9 is a circuit diagram of the temperature control circuitry and the power-on reset circuitry shown in FIG. 7.
Figure 9:
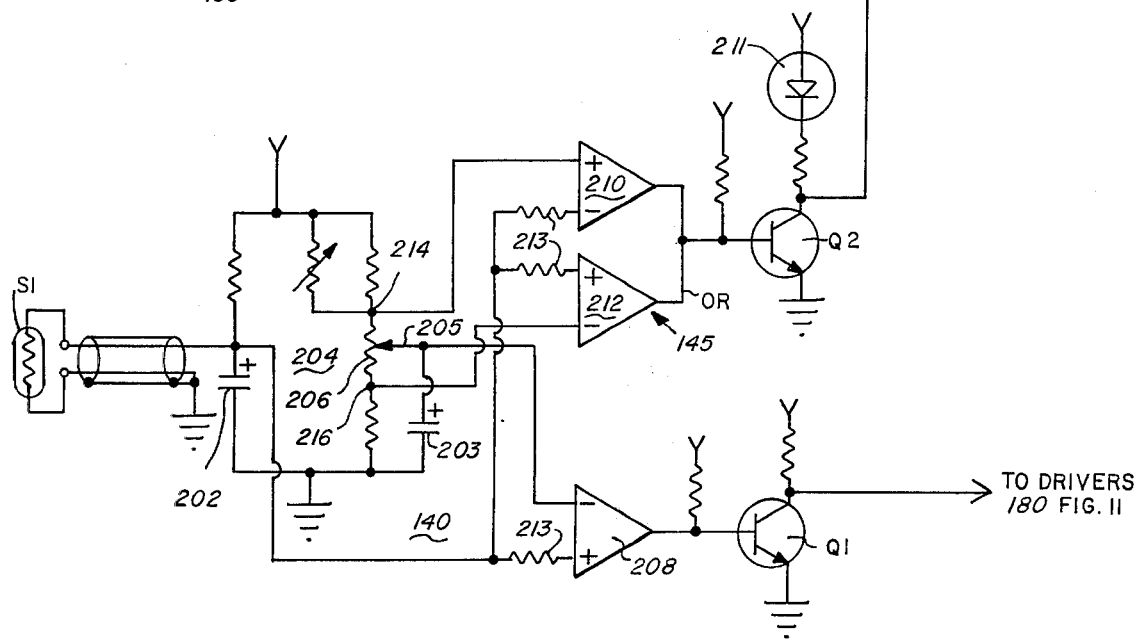

FIG. 9 shows in somewhat more detail circuit diagrams of the temperature control box 140, limit detector 145, and reset circuit 155. Sensor S1, also shown in FIG. 5 couples to bridge circuit 204. The output from the bridge circuit is taken at the moveable contact 205 of potentiometer 206. This output at the moveable contact is coupled to comparator 208. The output of the comparator 208 couples to transistor Q1 and the output of transistor Q1, as shown in FIG. 7 as line 141, couples to the drivers 180 to control the hot water valve V1.

The sensor S1 is preferably a negative temperature coefficient of resistance type thermistor whose resistance at nominal water temperatures of say 103°F is about 609 ohms. The temperature changes are sensed by bridge 204 by comparing the voltage at the thermistor with a preset value generated in the opposite leg of the bridge at the moveable contact 205. These signals are fed to comparator 208 and when a low temperature is sensed the output of the comparator 208 is high turning on transistor Q1 and subsequently opening the hot water valve V1 a predetermined time interval sufficient enough to raise the water so that the comparator 208 no longer senses a temperature comparison, at which time the output of comparator 208 goes low, transistor Q1 turns off and valve V1 closes.

Figure 10:
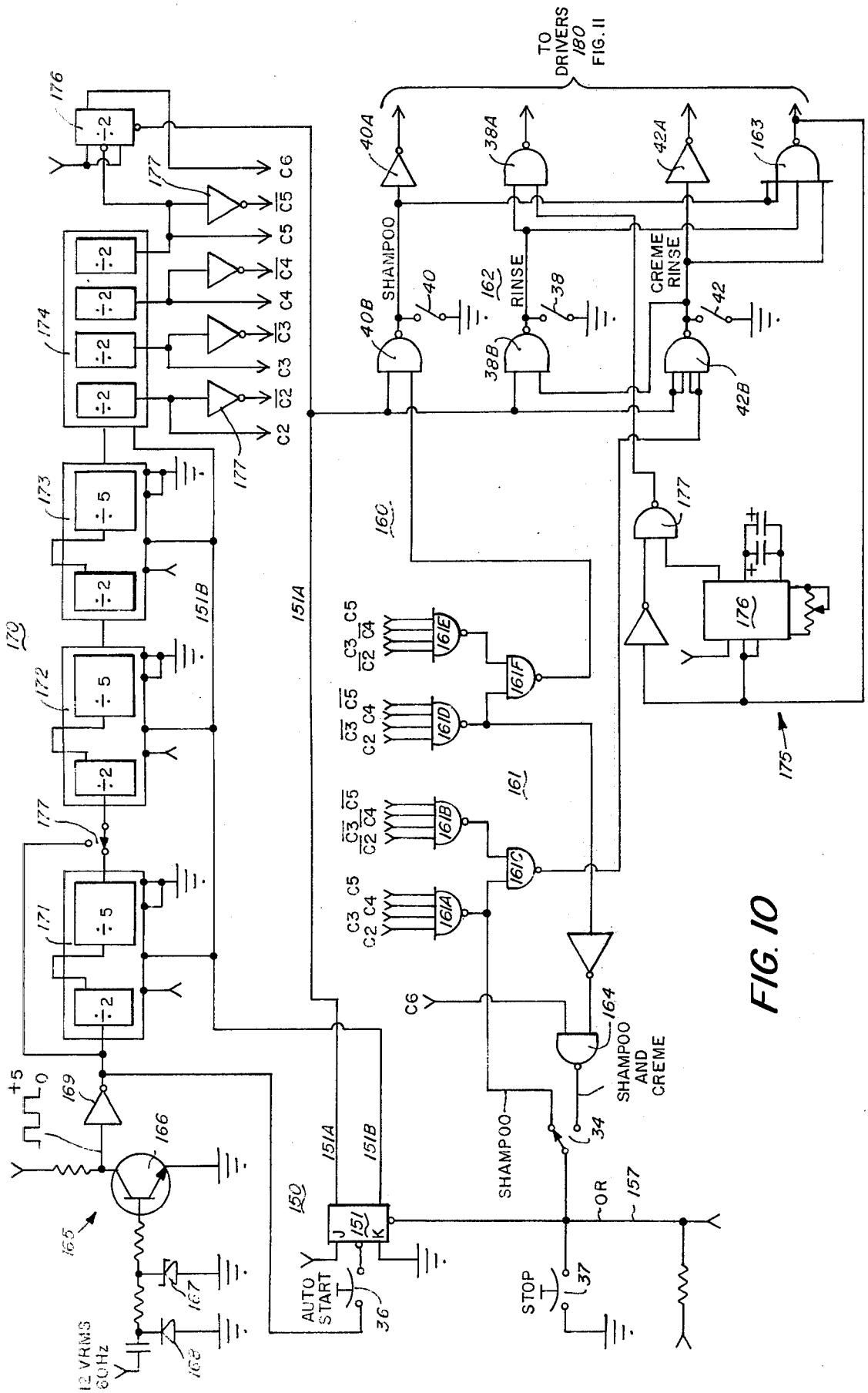
FIG. 10 is a logic and circuit diagram showing the start-stop latch circuitry, the time scaler, and the cycle control logic shown in FIG. 7.

The detector 145 includes comparators 210 and 212 and output transistor Q2. The upper and lower limit detection is accomplished by comparing the voltage across the thermistor with the upper and lower ends of the temperature fine adjustment potentiometer 206. Thus, comparator 210 compares the reference voltage with the voltage at node 214 and comparator 212 compares the reference voltage with the voltage at node 216. The total resistance value of the potentiometer is preferably chosen to make the upper and lower temperatures about 10°F apart. The comparators 210 and 212 are integrated circuit comparators whose outputs are wired together to create a logic "OR" function. If the water temperature is somewhere between the two limits, the common output of comparators 210 and 212 is high. With this output high transistor Q2 is on in turn causing the light emitting diode (LED) 211 shown on the control panel of FIG. 1 as indicator 31, to be illuminated, thereby indicating that the temperature is in the correct range and that the machine is ready. In FIG. 9 the collector of transistor Q2 coupled to inverting gate 156 whose output in turn couples to reset line 157. When transistor Q2 is conducting the output of gate 156 is high and a high level on line 157 does not reset the stop-start latch 150 which is shown in FIG. 10. FIG. 10 also shows the reset line 157 to which other components connect.

If the temperature sensed is outside of the permitted limits whereby the sensor voltage goes above or below the limits set at nodes 214 and 216, either of the comparators 210 or 212 will change state and the OR output from these comparators has a low level. This low level signal which is coupled to the base of transistor Q2 turns transistor Q2 off and the light emitting diode associated therewith is also turned off. Thus, a high level signal is coupled to gate 156 and the output of this gate goes low thereby resetting the stop-start latch 150 (see Line 157 of FIG. 10). When the temperature is corrected the low level reset on line 157 is removed.

In FIG. 9, the capacitors 202 and 203 associated with the bridge 204 reduce the electrical noise due to, for example, power supply and logic noise. The resistors 213 on the comparator inputs prevent the comparators from interacting because of their non-linear input impedance characteristics.

FIG. 9 also shows the power-on reset circuit 155. This circuit resets all the logic to a predetermined state when power to the machine is turned on as discussed previously. The reset circuit 155 includes a plurality of logic gates and two RC timing networks 158 and 159. This circuit provides a waveform as depicted in FIG. 9 on line 157. The time periods T1 and T2 are controlled by the networks 158 and 159. During the time interval T1 there is a delay which permits the logic of the system to turn on. When the waveform goes to its low level during period T2 the stop-start latch 150 is reset via line 157. Thus, the latch 150 is initially reset when power is turned on and the machine is in readiness for either manual or automatic use.

Referring now to FIG. 10 there is generally shown the stop-start latch 150, the timing generator 165, the time scaler 170, the cycle control logic 160 and the clear logic 175.

Figure 13:
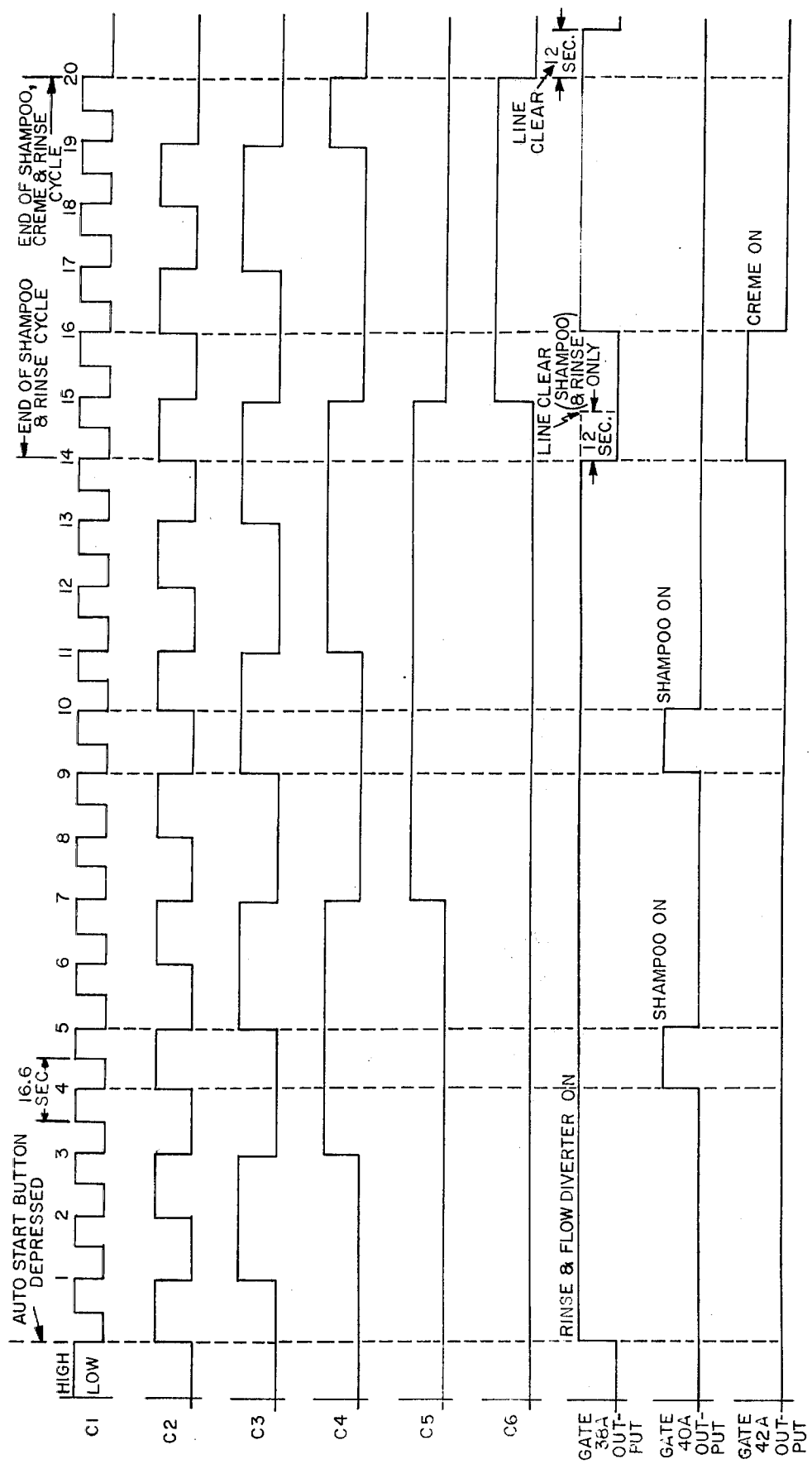
FIG. 13 is a timing diagram depicting the cycle times in relation to the output of the time scaler.
Figure 14:
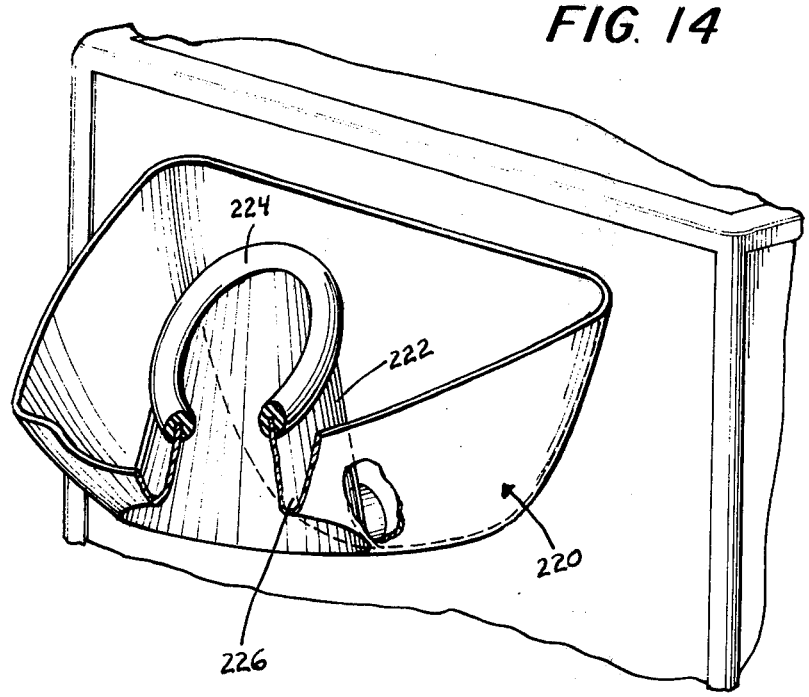
FIG. 14 is a cut-away prspective view of an alternate, preferred embodiment of the sink structure shown in FIGS. 1 and 2.

The timing generator 165 is for converting the 60 Hertz line frequency at 12 volts RMS to a square wave signal of like frequency. The generator 165 includes a transistor 166, typical biasing resistors, and an input Zener diode 167. The Zener diode 167 clamps the input signal, as does the diode 168. The output of transistor 166 taken at the collector thereof is a squave wave signal as depicted in FIG. 10. This signal is coupled by way of inverting gate 169 to the time scaler 170. The diode 168 clamps the negative portion of the signal to approximately 0.7 volts. The Zener diode clamps the positive portion of the signal to approximately 5 volts. This swing is used to cause the cyclic conduction of transistor 166. The input time period provided by this signal is 16.6 milliseconds corresponding to a frequency of 60 Hertz. The time scaler 170 comprises binary counter stages 171, 172, 173, and 174, and a flip-flop 176. Each of the stages 171, 172, and 173 include a divide by two section and a divide by five section and thus each stage provides a total divide by ten of the received input signal. Thus, the combined stages 171, 172, and 173 divide the input signal from 60 Hertz down to 0.06 Hertz or a period of 16.6 seconds. This period is the basic time interval, as shown in FIG. 13. For test purposes, a switch 177 may be provided to speed up the control cycle by a factor of 10 by effectively eliminating the first stage 171.

The output from stage 173 is coupled to the fourth stage 174 which is in itself a binary counter. The output from this counter is coupled to a further divide by two flip-flop 176. The output from the stage 174 and the flip-flop 176 provide the basic timing signals shown in FIG. 13 and coupled primarily to the cycle control logic 160 also shown in FIG. 10. The outputs from stage 174 and flip-flop 176 are also coupled by way of inverting gates 177 to provide the complimentary outputs. These outputs are identified as the C2, $\overline{C2}$, C3, $\overline{C3}$, C4, $\overline{C4}$, C5, $\overline{C5}$, and C6 outputs.

The stopping and starting of the machine cycle effects the time scaler 170. Thus, when the cycle is to be stopped all of the stages of the time scaler are reset by way of lines 151A and 151B coupled from flip-flop 151 which comprises the stop-start latch 150. When the flip-flop 151 is reset line 151B is high resetting the stages 171-174. At the same time, line 151A is low resetting flip-flop 176. Upon reset the stages 171, 172 and 173 are set to nine and the stage 174 and flip-flop 176 are set to zero. This is done, instead of setting all outputs to zero, to minimize the delay after starting for the count to propagate through the counter. A maximum of 16.6 milliseconds is required to start any machine cycle in this configuration.

Referring still to FIG. 10, all starting and stopping functions during automatic operation are controlled by flip-flop 151. This flip-flop is a J-K type having an asynchronous clear input. The J is tied to + 5 volts and the K is tied to ground. After the power has been turned on, the reset circuit resets the flip-flop 151 by way of line 157 and this in turn resets the time scaler 170. When the auto start button 36 (see FIG. 1) is operated the output from gate 169 is coupled to flip-flop 151. On the first falling edge of the 60 Hertz square wave the flip-flop 151 sets and the signal on line 151A goes high with the signal on 151B going low. These levels at the output of flip-flop 151 permit the time scaler 170 to operate. By using the 60 Hertz square wave signal to operate the stop-start there is some logic saved in that there is no need for switch bounce elimination circuits in association with the auto-start pushbutton 36.

The stopping of any automatic cycle is accomplished by clearing or resetting flip-flop 151 by way of line 157. A low level signal on line 157 accomplishes the clearing and resetting operation. It has been previously discussed that this resetting can be accomplished at power turn-on by way of reset circuit 155, or when the temperature falls outside of the desired range wherein a signal is generated from the detector 145 by way of gate 156 shown in FIG. 9. The flip-flop 151 may also be reset from the stop push-button 37 (see FIG. 1) which couples a low level signal to the clear input of flip-flop 151. Finally, at the end of an automatic cycle a low level signal is coupled to line 157 from the cycle control logic 160.

When flip-flop 151 is set, meaning that automatic operation is occurring, 151A is high and this enables gates of the cycle control logic 160. Alternatively, when flip-flop 151 is reset this line goes low and inhibits these gates which control the operation of the valves discussed in more detail hereinafter.

Figure 11:
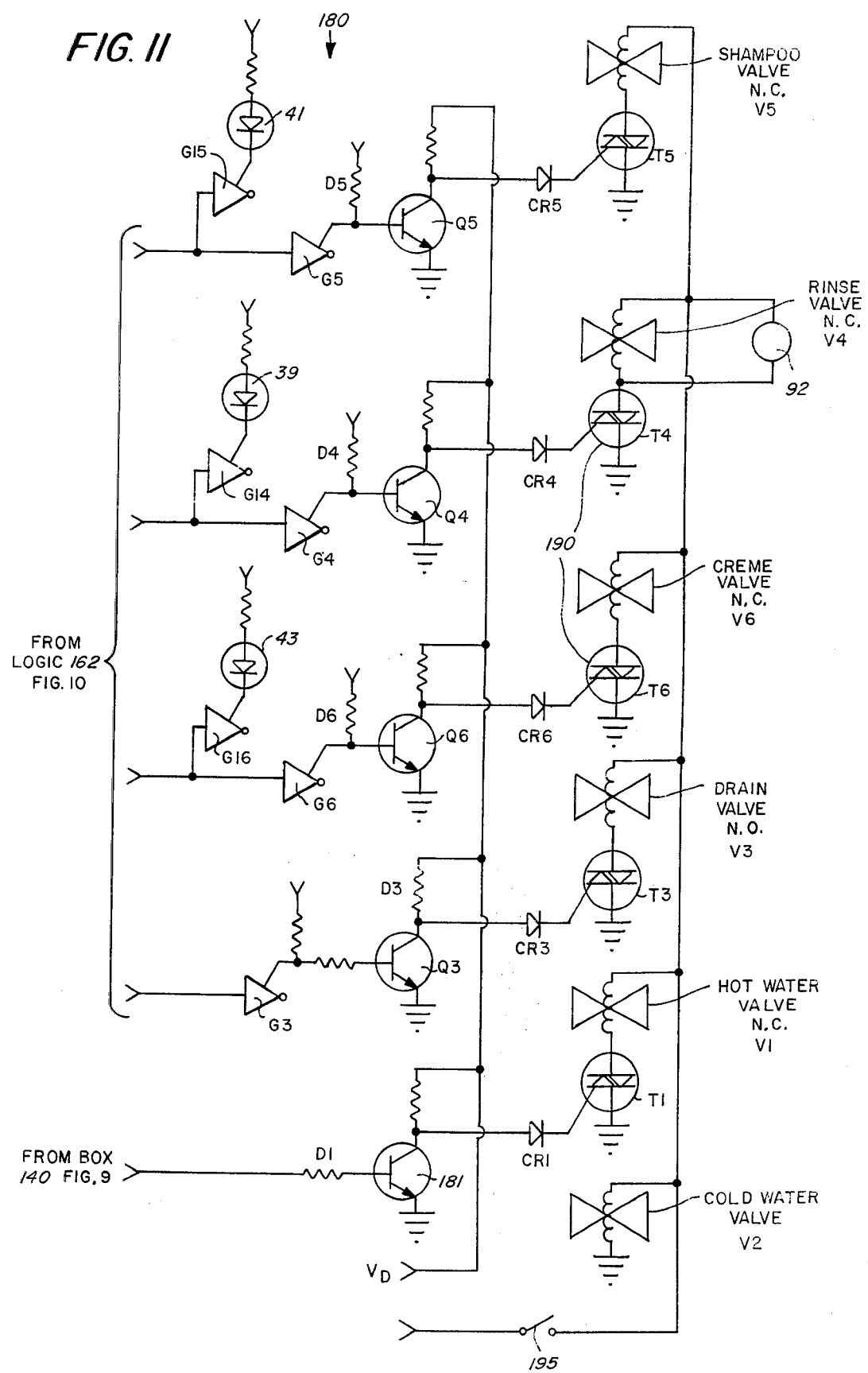
FIG. 11 shows the driver circuits and associated valves referred to in the block diagram of FIG. 7.

The cycle control logic 160 also shown in FIG. 10 performs two basic functions. Firstly, it decodes the five binary outputs (C2–C6) from the time scaler 170 into specific commands for controlling the valves V3–V6, and secondly it detects the end of a cycle and resets the stop-start latch 150 by way of line 157. The decoding of the outputs (C2–C6) and their negations from scaler 170 is accomplished primarily by logic 161 whose outputs couple to output logic 162, and by way of cycle select switch 34 (see FIG. 1) to the clear or reset line 157. FIG. 10 also shows the line clear logic 175 which includes a monostable multi-vibrator 176. The logic 175 is discussed in more detail hereinafter. FIG. 11 shows the drivers 180 and associated thyristors 190 which drive the valves V1–V6 and the flow diverter 92 which is coupled across the rinse valve V4.

For manual operation there are provided in FIG. 10 three switches previously shown in FIG. 1, and identified as the rinse switch 38, shampoo switch 40 and creme rinse switch 42. When either of these switches is closed a low level signal is coupled to the corresponding gates 38A, 40A and 42A, respectively. The output of the gate corresponding to the closed switch is thus at a high level. The output from the gates 38A, 40A and 42A couple to the drivers D4, D5 and D6 shown in FIG. 11. The drivers D4, D5 and D6 are associated respectively with rinse valve V4, shampoo valve V5 and creme rinse valve V6 and respectively each include gate G4 and transistor Q4; gate G5 and transistor Q5; and gate G6 and transistor Q6. The driver D3 also includes a gate G3 and a transistor Q3. The final driver for controlling hot water valve V1 includes a transistor 181. Each of the valves shown in FIG. 11 with the exception of the cold water valve V2 has a corresponding thyrister T1, T3–T6 associated respectively therewith. The flow diverter 92 is coupled across valve V4 which is in series with thyristor T4.

Thus, if shampoo switch 40, for example, is closed a high level signal is coupled to gate G5 which is an inverting gate. The output of gate G5 is a low level signal which turns transistor Q5 off. With transistor Q5 off a current is provided through diode CR5 to thyrister T5 for causing conduction of thyrister T5. At that time, the normally closed valve V5 opens and shampoo is dispensed to the nozzle array. The high level signal to gate G5 is also coupled by way of G15 to indicator 41 also shown in FIG. 1. In FIG. 11 the indicator is a light emitting diode LED. Similarly, if the rinse switch 38 is closed transistor Q4 is turned off, thyristor T4 is conductive and the normally closed rinse valve V4 is opened. At the same time, gate G14 causes illunination of LED 39. Also, if switch 42 is closed transistor Q6 is turned off, thyristor T6 is conductive and the normally closed creme rinse valve V6 is opened. At the same time gate G16 causes conduction of LED 43.

In FIG. 10 there is also shown as part of logic 162 a NAND gate 163 which has three inputs coupling from the shampoo, rinse and creme rinse lines. If any of these three functions is in operation, whether under automatic or manual operation, the output of gate 163 is high. This signal is coupled to gate G3 of FIG. 11 and to transistor Q3 turning off transistor Q3. This action in turn causes thyristor T3 to conduct and energizes drain valve V3. Valve V3 is normally open and thus upon energization closes to prevent drainage of the mixed hot and cold water and to permit pressurization of the storage tanks. In FIG. 11 the cold water valve V2 is automatically opened as long as the hood switch 195 is closed and there is power provided to the thermistors 190.

Figure 12:
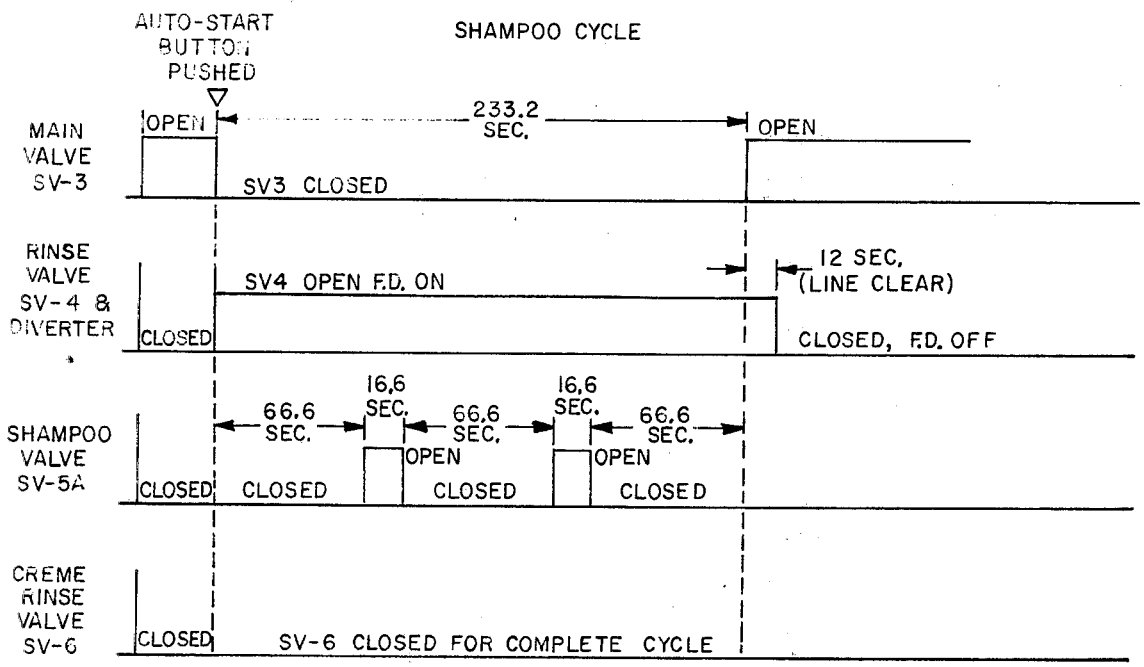
FIG. 12 is a time sequence diagram showing the basic cycle times for both a shampoo cycle and a shampoo and creme rinse cycle.
Figure 12:
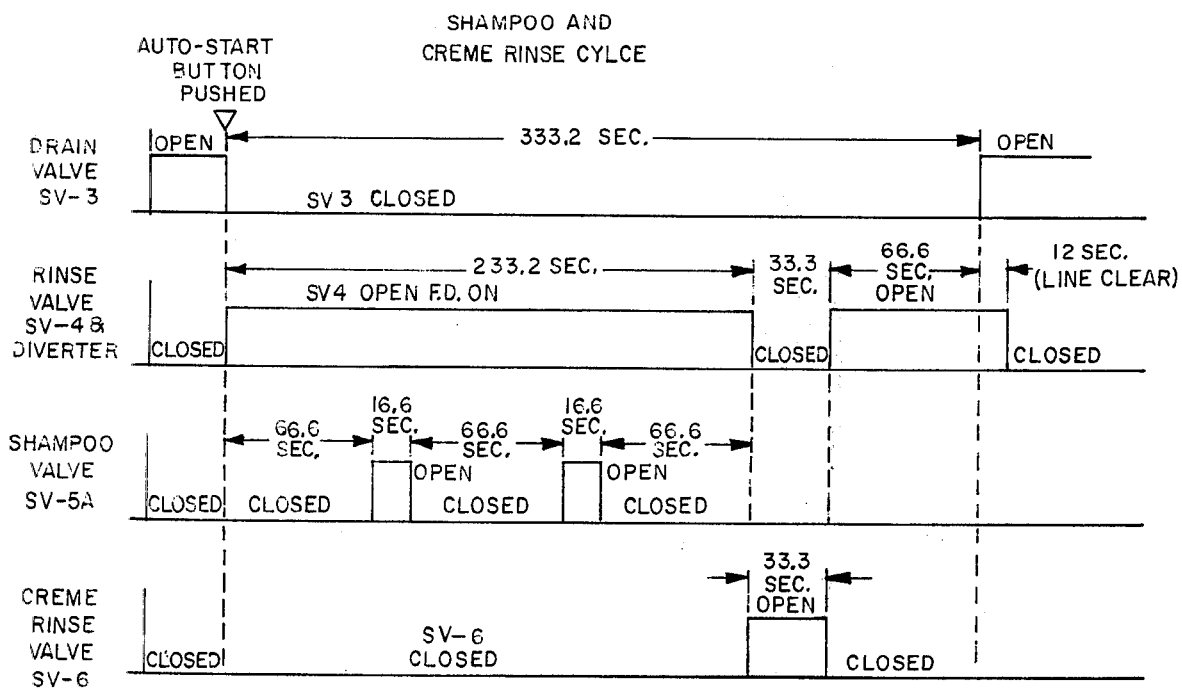

For automatic operation reference is now made to the circuit diagrams of FIGS. 10 and 11 and also to the timing diagrams shown in FIGS. 12 and 13. For the shampoo cycle, the select switch 34 is in the position shown in FIG. 10.

For automatic operation in the shampoo cycle, it can be seen that once the flip-flop 151 is set the gates 38B, 40B, and 42B are enabled by way of line 151A. At that point, the gate 42B has a high output as controlled from gates 161A, 161B, and 161C of logic 161. Neither of the gates 161A or 161B has a low output and thus the output from gate 161C is low causing a high output from gate 42B. This high output is coupled to gate 38B and along with the high signal from line 151A causes a low output from gate 38B. This operates the rinse valve V4 to its open position as indicated in FIG. 12 and also in FIG. 13. At the same time that the rinse valve V4 opens the gate 163 which has one line coupled from gate 38B, has a high output which coupled to driver D3 of FIG. 11 causing the normally opened drain valve to close. FIG. 12 shows the main drain valve V3 in this closed position after the auto-start button has been pushed. As long as the gate 42B maintains its high output the rinse will continue and the creme rinse will be disabled. If operating in the shampoo cycle the creme rinse valve is continuously maintained closed unless manually operated.

At a point in the cycle the binary outputs from scaler 170, namely outputs C2, $\overline{C3}$, C4, $\overline{C5}$ are decoded by gate 161D. When this occurs a high level is coupled from gate 161F to gate 40B thereby enabling gate 40B and initiating the shampoo portion of the cycle. With gate 40B enabled driver D5 causes the shampoo valve V5 to be opened thereby dispensing shampoo by way of the nozzle array. This shampoo operation continues for one period or 16.6 seconds and then gate 161D is inhibited. At a later point in the cycle as shown in FIGS. 12 and 13, after an idle period of 66.6 seconds the shampoo valve V5 is again operated when gate 161E decodes the binary code $\overline{C2}$, C3, $\overline{C4}$ and C5.

After the second shampoo portion of the cycle the code C2, C3, C4, C5 is decoded by gate 161A. This low level signal is coupled by way of switch 34 to reset line 157 for resetting the latch 151 and terminating the automatic shampoo cycle. When this occurs the signal on line 151A is low automatically inhibiting the gates 38B, 40B and 42B and preventing any further operation of the shampoo, rinse, or creme rinse valve, with the exception of a preferably 12 second line clear interval which is controlled from the line clear logic 175 whose output is coupled to gate 38A permitting further operation of the rinse valve V4 for a small period of, for example, twelve seconds.

The line clear logic 175 operates so that when the output of gate 163 goes low thereby opening the drain valve, the multi-vibrator 176 is activated. The high-to-low transition triggers this multi-vibrator for a period that is adjustable and that may be set at approximately 12 seconds. When this occurs gate 177 has a low output which is coupled to gate 38A. Gate 38A in turn has a high output which holds the rinse V4 in its open position for as long as the multi-vibrator 176 is in its activated state. After the twelve second interval the multi-vibrator 176 returns to its stable state and the rinse valve V4 closes.

FIGS. 12 and 13 show this 12 second line clear interval, the purpose of which is to clear the drain lines after the use of a shampoo or a creme rinse or both.

In the other automatic mode, namely the one wherein both shampoo and creme rinse are dispensed, the select switch 34 is in the position opposite to that shown in FIG. 10 wherein the output of gate 164 is coupled to the clear line 157. The shampoo and creme rinse cycle is similar to the shampoo cycle and is in fact identical to it through the first portion of the cycle as shown most clearly in FIGS. 12. However, because the select switch is in the alternate position the flip-flop 151 is not reset at timing interval 14 (see FIG. 13) but instead the resetting occurs at a later time. In this cycle of operation the shampoo is dispensed in two segments of a cycle as depicted in FIG. 12 and when gate 161A receives the C2, C3, C4 and C5 input gate 42B has a low output which in turn activates the creme rinse valve V6. The output of gate 42B also disables gate 38B and prevents any rinse during the creme rinse cycle. It is noted in FIG. 12 that during the time that the valve V6 is open, the valve V4 is closed. This creme rinse cycle continues through the decode of the signal $\overline{C2}$, $\overline{C3}$, $\overline{C4}$, and $\overline{C5}$ as sensed by gate 161B. Thereafter, the creme rinse valve V6 closes and concurrently therewith the rinse valve V4 opens. The end of the cycle is sensed by gate 161D in combination with the C6 output from flip-flop 176. Gate 164 senses this and resets flip-flop 151 to terminate the cycle. The line clear logic 175 again provides a 12 second interval wherein gate 38A is enabled causing an additional twelve second operation of the rinse valve in a manner similar to that discussed with reference to the shampoo cycle.

As previously discussed, when transistor Q1 shown in FIG. 9 conducts due to a sensed temperature change, transistor 181 in FIG. 11 turns off and thyristor T1 is driven into conduction. At that time, hot water valve V1 which is normally closed opens until comparator 208 shown in FIG. 6 readjusts itself.

FIG. 13 shows another preferred embodiment of the sink shown previously in FIG. 2. This sink 220 can attach to the machine by suitable means and specifically includes a tubular center section 222 terminating in a rest 224 at its top end and being open at its bottom end so that the person in the machine has an unobstructed view downwardly. A wrap-around channel 226 is provided for carrying liquids to the drain.

Having described one embodiment of the present invention, it should now be apparent to those skilled in the art that numerous modifications can be made in the invention, all of which are contemplated falling within the spirit and scope of the present invention.

What is claimed is:

1. An apparatus for cleansing a person's hair and scalp comprising;
   a sink having a liquid drain for removing liquid from the sink,
   means for supporting the sink,
   means defining a rest for the face of the person, said rest disposed in the sink in a fixed position relative to the sink and having liquid sealing means, whereupon the person may assume a seated position and have the face contacting the liquid sealing means of the rest and directed generally downwardly,
   a hood means movable to cover the scalp of the person,
   one of said hood means and sink having liquid sealing means associated therewith,
   and means disposed within said hood means in a fixed position relative to the hood means for directing water or shampoo at the scalp.

2. The apparatus of claim 1 wherein said rest includes a forehead support member and a chin support member.

3. The apparatus of claim 2 wherein said sink is defined in part by an enclosing wall having means defining a neck seal comprising the liquid sealing means.

4. The apparatus of claim 1 wherein said hood means includes a handle for moving said hood means between a scalp covering and uncovering positions.

5. The appratus of claim 4 including means for limiting the covering position of the hood means.

6. The apparatus of claim 1 wherein said directing means includes an array of dispensing nozzles.

7. The apparatus of claim 6 wherein the nozzles are disposed along concentric locii.

8. The apparatus of claim 7 including nozzles for dispensing water, creme rinse and shampoo.

9. The apparatus of claim 8 wherein the shampoo and creme rinse dispensing nozzles are disposed along the same locus.

10. The apparatus of claim 9 wherein the shampoo and creme rinse nozzles alternate along the locus and the water nozzles are disposed along different locii.

11. The apparatus of claim 6 including means for controlling the dispensing of liquid from the nozzles.

12. The apparatus of claim 11 wherein the nozzle array includes a plurality of rinse water nozzles, and said control means includes means for sequentially coupling water to the rinse nozzles.

13. The apparatus of claim 12 wherein said hood means includes means defining a space adjacent said nozzle array, and said means for sequentially coupling includes a flow diverter contained in said space.

14. The apparatus of claim 11 wherein said control means comprises control circuitry including a mode select switch, a cycle select switch, a rinse switch, a shampoo switch and a creme rinse switch.

15. The apparatus of claim 11 including a tank for storing shampoo and a tank for storing creme rinse and lines coupling from each tank to their corresponding nozzles.

16. The apparatus of claim 15 including valve means for selectively controlling the dispensing of shampoo and creme rinse.

17. The apparatus of claim 1 wherein said rest is defined by a tubular member open at the bottom.

18. A container for dispensing a rinsing or cleansing liquid and for use in a shampooing apparatus having means for receiving hot and cold pressurized water lines, said container comprising;
   means defining a first section for containing the liquid,
   and means defining a second section forming a mixing chamber having means for receiving the hot and cold pressurized water,
   said sections being separated by a plate having a passage means for permitting pressurization of the liquid in the top section.

19. The container of claim 18 including a diaphragm in the top section for holding the liquid.

20. The container of claim 19 wherein said top section has a fill port for replenishing the liquid.

21. The container of claim 19 including baffle means in said mixing chamber.

22. The container of claim 21 wherein said plate is perforated.

23. In an apparatus for cleansing a person's hair and scalp and having a hood means and associated nozzle array for dispensing at least rinse water and shampoo, means for controlling the dispensing of the liquid from the nozzles of the array, comprising;
   means for selecting automatic operation,
   binary counter means and associated decoder means for demarcating time intervals,
   means for enabling operation of said binary counter upon operation of said selection means,
   said decoder means including means defining at least one shampoo interval,
   and shampoo valve means responsive to said decoder means for dispensing shampoo during said defined shampoo interval.

24. The control means of claim 23 including rinse valve means, said decoder means including means defining a rinse interval, and said rinse valve means is responsive to said decoder means for dispensing rinse water during said defined rinse interval.

25. The control means of claim 24 wherein said selecting means includes a bistable device and means for setting the bistable device to its automatic state, said bistable device including a reset line for resetting the device when the automatic operation is to stop.

26. The control means of claim 25 including a stop switch for resetting the bistable device.

27. The control means of claim 25 including end of cycle decode means responsive to said binary counter for resetting the bistable device.

28. The control means of claim 27 including switch means for selecting one of two types of automatic cycles.

29. The control means of claim 25 including temperature range sense circuitry and a temperature sensor for sensing the temperature of the mixed hot and cold water, said sense circuitry and sensor for resetting said bistable device.

30. The control means of claim 25 including a reset circuit for resetting said bistable device when power is applied to the apparatus.

31. The control means of claim 24 including a creme rinse valve means, said decoder means including means defining a creme rinse interval, and said creme rinse valve is responsive to said decoder means for dispensing creme rinse during said defined creme rinse interval.

32. The control means of claim 31 wherein said creme rinse valve means and said rinse valve means operate mutually exclusively.

33. The control means of claim 31 including manual switch means for selectively controlling the rinse, shampoo and creme rinse valve means.

34. The control means of claim 27 including means for operating said rinse valve means for a short predetermined period after the end of cycle.

35. The control means of claim 23 including hot water valve means and temperature sensing means for selectively operating said hot water valve means.

36. A temperature sensing circuit for detecting a temperature range and for use in a shampooing apparatus receiving mixed hot and cold water and having a hot water valve means, said circuit comprising;
   a temperature dependent resistive element,
   a bridge circuit including two legs and having the resistive element disposed in one leg thereof,
   a pair of comparators having one input coupled in common and to the resistive element and the other input coupled respectively to different points in the other leg of the bridge circuit,
   and output means responsive to operation of either comparator for indicating a temperature outside of said temperature range.

* * * * *